N. D. GOVER.
WASHING MACHINE.
APPLICATION FILED OCT. 7, 1915.
1,176,543.
Patented Mar. 21, 1916.
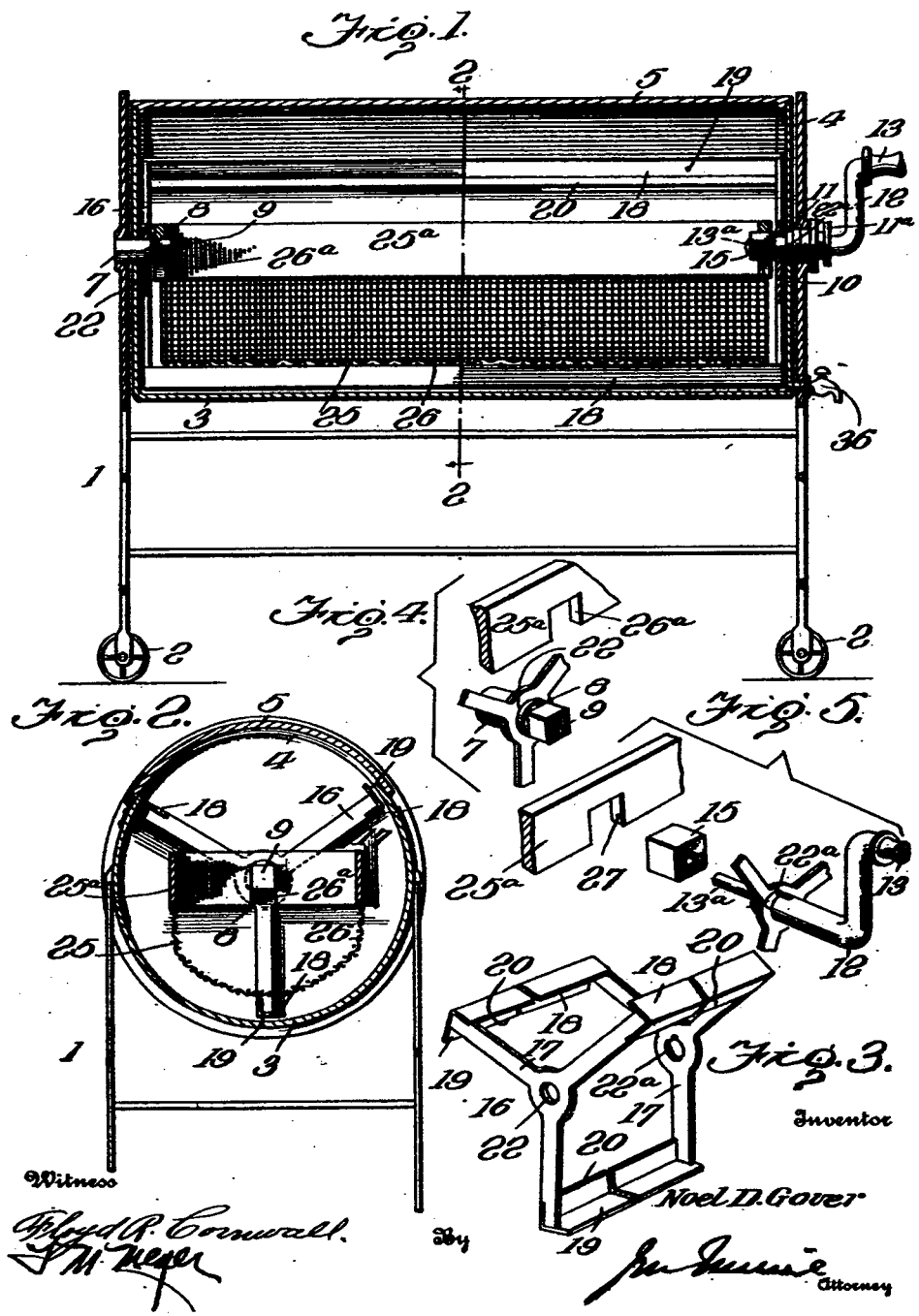
Inventor
Noel D. Gover

UNITED STATES PATENT OFFICE.

NOEL D. GOVER, OF LOOMIS, MICHIGAN.

WASHING-MACHINE.

1,176,543.  Specification of Letters Patent.  Patented Mar. 21, 1916.

Application filed October 7, 1915. Serial No. 54,617.

*To all whom it may concern:*

Be it known that I, NOEL D. GOVER, a citizen of the United States, residing at Loomis, in the county of Isabella and State of Michigan, have invented certain new and useful Improvements in Washing-Machines, of which the following is a specification.

This invention relates to improvements in dish washing machines.

The object of the invention is to provide a dish washing machine so constructed that the parts may be quickly and conveniently separated for cleaning purposes, and one which will be effective in operation.

A further object of the invention is to provide a construction which will agitate and lift the water and deliver same to the dishes to effectively wash the latter in the operation of the machine.

The invention also comprehends improvements in the details of construction and arrangement of parts which will be hereinafter described and particularly pointed out in the claims.

In the accompanying drawings: Figure 1 is a central vertical section of my improved dish washer. Fig. 2 is a cross section of the same on the line 2—2 of Fig. 1. Fig. 3 is a detail perspective view of the water lifting device. Fig. 4 is a detail perspective view of one end of the dish rack, and the bearing for supporting said end, the parts being separated. Fig. 5 is a similar view of the opposite end of the dish rack and the bearing for supporting the same, the parts being separated.

1 indicates a frame, mounted on wheels 2, that the machine may be conveniently moved from place to place. Mounted in the frame is a cylindrical receptacle 3, formed in the top with an opening 4, a cover 5 being employed to close the opening. Extending inwardly from one end of the cylindrical casing is a trunnion 7, having a cylindrical portion 8, and a squared inner end 9. In the opposite end 10, of the cylindrical receptacle, is an opening 11, having a stuffing box 11ª, through which extends a crank 12, having a handle 13. From the end of the horizontal portion of the crank extends a journal 13ª, on which is mounted a square block 15, the end of the stud being flattened to hold the block 15 in position, or a cotter pin or the like may be provided for this purpose.

16 indicates a water agitator and lifter, comprising arms or spiders 17, the adjacent arms being connected by longitudinal angle irons or flights 18. One member 19, of each angle iron, fits closely the inner surface of the cylindrical receptacle 3, while the other member, 20, of each of said flights extends substantially radial with the respective arms. The spiders are formed with openings 22 and 22ª. The opening 22 fits over the cylindrical portion 8, of the trunnion 7, and forms a support for one end of the agitator and water lifter. The opening 22ª is in alinement with the opening 22, and through same extends the horizontal portion on the crank 12, a key being provided to lock the agitator and water lifter to the crank.

25 indicates an open top dish rack, comprising a metal band 25ª, and a wire bottom portion 26. The ends of the band 25ª are formed with open alined slots 26ª and 27. The slot 26ª engages over the square portion 9, of the trunnion 7, while the slot 27 engages over the square block 15, as shown in Fig. 1. This construction forms a means for supporting the dish rack in the receptacle.

The dish rack is stationarily supported in spaced relation to the walls of the receptacle to form a passage for the flights, and to provide means for causing the water to freely circulate.

When the parts are assembled, the dishes are inserted through the opening 4 to the dish rack, the open mesh of the latter allowing the water to pass freely between the dishes. The crank 12 is rotated, and because of the construction of the flights, the water is lifted from the bottom of the space between the dish rack, and the cylindrical receptacle to the top thereof, and is discharged into the dish rack and against the dishes contained therein. As the flights rotate, the water in the dish rack is not only agitated, but is elevated to the top and discharged, the force of the water striking the dishes to effectually remove the dirt, while the movement of the flights causes a constant circulation of the water through the rack and between the dishes.

In the end wall of the cylindrical receptacle is a valve 36. After the dishes have been cleaned sufficiently, the valve 36 is opened and the dirty water is drawn off. Clean, hot water is then introduced into the receptacle, and by rotating the flights, the dishes are subjected to another cleaning, whereupon the valve can be opened, and the hot water drawn off, and the dishes permitted to dry.

By constructing the parts as described, it is evident that the water agitator and lifter are rotated through the instrumentality of the handle 12, in the space between the dish rack and the cylindrical receptacle, and when it is desired to remove the dish rack, the same can be conveniently lifted through the opening in the top, and without removing the flights.

In the drawing I have shown but three flights, but obviously more or less may be used if desired. In any event, however, the distance between two of the flights must be such as will permit the withdrawal of the cylindrical dish rack through the opening when it is desired to remove the dish rack from the receptacle. The block on the end of the crank, while forming a bearing for one end of the dish rack, also serves the purpose of preventing the dish rack being turned in the receptacle.

What I claim is:—

1. In a dish washing machine, the combination of a cylindrical receptacle formed at one end with an opening, a trunnion extending inwardly from the opposite end of the receptacle in alinement with the opening, said trunnion having a cylindrical portion and a squared portion, a crank, said crank having a journal on its end, a square block mounted on the journal, a frame secured to the crank and rotatable on the cylindrical portion of the trunnion, said frame having longitudinal water lifts operating adjacent the inside of the receptacle, and a dish supporting cage having square slots which engage the square portion of the trunnion and the square block.

2. In a dish washing machine, the combination of a cylindrical receptacle, a trunnion extending from one end of the receptacle, said trunnion having a cylindrical portion and a square end, the opposite end of the receptacle having an opening, a crank shaft rotatable in the opening, said crank shaft having a journal extended from its inner end, a square block mounted on the journal, a frame having longitudinal angular water lifters, one end of said frame being secured against turning on the crank shaft and its opposite end being rotatably mounted on the cylindrical portion of the trunnion, a dish rack comprising a top metal band and a depending wire portion, the ends of the band having alined open end slots which fit over the square portion of the trunnion and the square block on the shaft, whereby to prevent said rack rotating.

In testimony whereof I affix my signature in the presence of two witnesses.

NOEL D. GOVER.

Witnesses:
EMILY F. CAMP,
MIRIAM STERN.

Copies of this patent may be obtained for five cents each, by addressing the "Commissioner of Patents, Washington, D. C."